United States Patent
Draizin et al.

(10) Patent No.: US 6,639,978 B2
(45) Date of Patent: Oct. 28, 2003

(54) METHOD FOR DETERMINING AN ENTITY RESPONSIBLE FOR BILLING A CALLED PARTY

(75) Inventors: Nadia Draizin, Plantation, FL (US); Aytxa Ramirez, Pembroke Pines, FL (US); David J. Walsh, Ft. Lauderdale, FL (US)

(73) Assignee: Evercom Systems, Inc., Irving, TX (US)

( * ) Notice: Subject to any disclaimer, the term of this patent is extended or adjusted under 35 U.S.C. 154(b) by 0 days.

(21) Appl. No.: 10/022,946

(22) Filed: Dec. 17, 2001

(65) Prior Publication Data

US 2003/0112934 A1 Jun. 19, 2003

(51) Int. Cl.[7] .................. H04M 15/00; H04M 3/42; H04M 7/00
(52) U.S. Cl. .................. 379/114.21; 379/114.02; 379/221.13; 379/201.01; 379/207.14; 379/207.15; 379/127.01; 379/221.14
(58) Field of Search .................. 379/121.05, 126, 379/114.29, 114.28, 114.02, 114.21, 114.23, 127.01, 114.26, 121.01, 115.01, 115.02, 121.06, 127.03, 127.05, 127.06, 130, 144.02, 144.01, 221.13, 207.13, 207.14, 207.15, 221.14

(56) References Cited

U.S. PATENT DOCUMENTS

| | | | |
|---|---|---|---|
| 4,933,966 A | | 6/1990 | Hird et al. |
| 5,319,701 A | | 6/1994 | Hird et al. |
| 5,483,581 A | | 1/1996 | Hird et al. |
| 5,483,582 A | | 1/1996 | Pugh et al. |
| 5,638,431 A | | 6/1997 | Everett et al. |
| 5,661,792 A | * | 8/1997 | Akinpelu et al. ........... 379/221 |
| 6,031,898 A | * | 2/2000 | Jordan ...................... 379/114 |
| 6,078,657 A | * | 6/2000 | Alfieri et al. ............... 379/220 |
| 6,097,802 A | * | 8/2000 | Fleischer et al. ........... 379/211 |
| 6,130,941 A | * | 10/2000 | Nimmagadda et al. ..... 379/230 |
| 6,169,793 B1 | * | 1/2001 | Godwin et al. ............. 379/207 |
| 6,438,223 B1 | * | 8/2002 | Eskafi et al. ........... 379/221.13 |
| 6,442,259 B2 | * | 8/2002 | Culli et al. ............ 379/114.05 |

* cited by examiner

Primary Examiner—Rexford Barnie
(74) Attorney, Agent, or Firm—Fulbright & Jaworski L.L.P.

(57) ABSTRACT

A method for determining an identity of an entity responsible for billing a called party of an alternatively billed telephone call is disclosed. The method comprises receiving a telephone number, the telephone number being associated with the called party. An initial entity identifier is acquired, the initial entity identifier being an OCN associated with the telephone number. Additional steps may be made in response to the telephone number wherein more accurate information is gathered and utilized to ensure the reliable determination of the identity of the entity responsible for ultimately billing the called party.

21 Claims, 1 Drawing Sheet

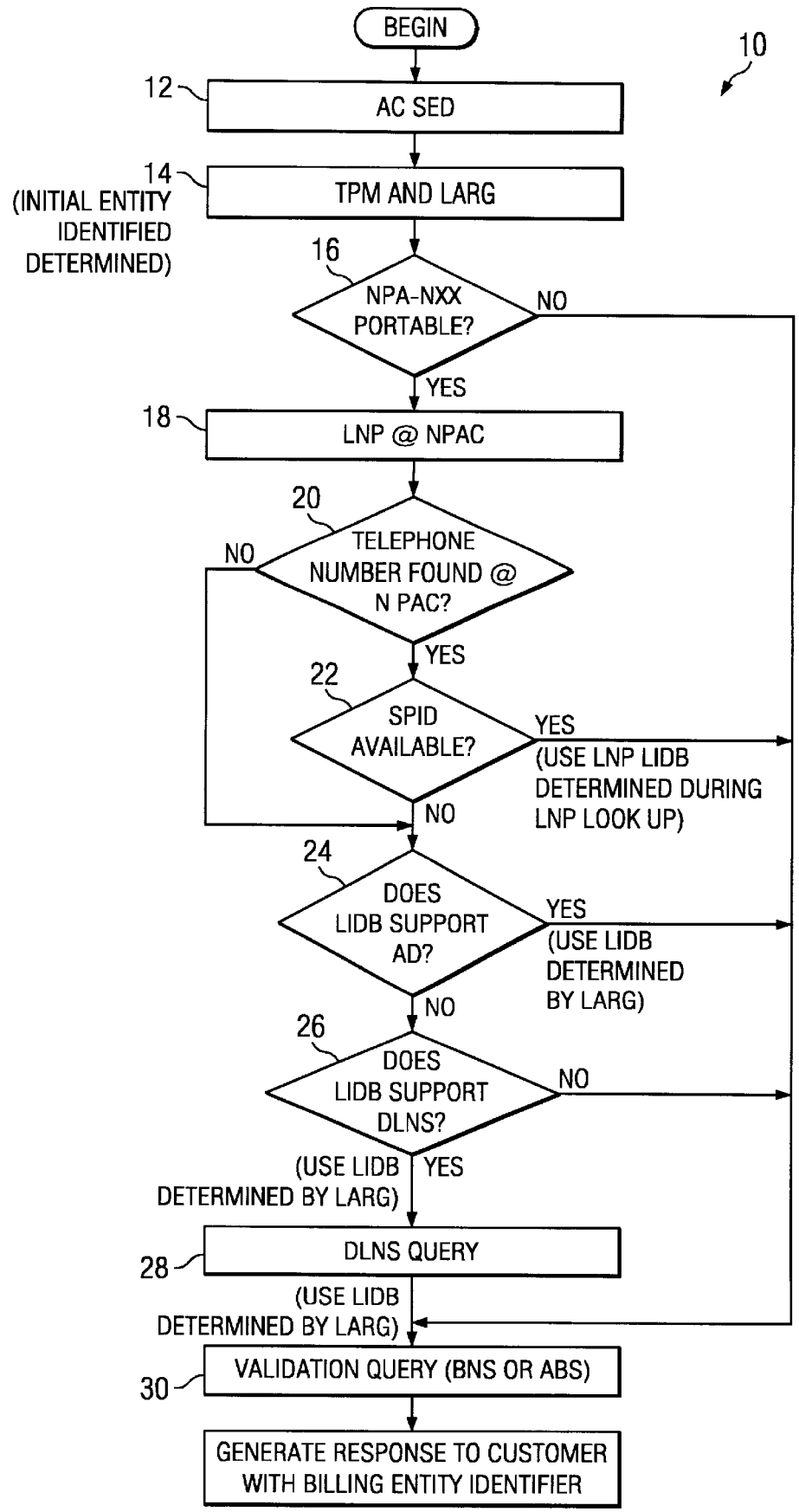

METHOD FOR DETERMINING AN ENTITY RESPONSIBLE FOR BILLING A CALLED PARTY

TECHNICAL FIELD

The present invention is generally related to telecommunications. More specifically, the present invention is related to reducing the risk related to receiving compensation for telephone services by enhancing the ability to identify a billing entity associated with a party receiving such services, e.g., properly billing a called party of an alternatively billed telephone call.

BACKGROUND OF INVENTION

Telephone callers have various payment options available for placing a telephone call. Some of these billing options include, calling cards, pre-paid calling cards, third party billing, credit cards, collect calling, etc. Although a few of these alternative billing mechanisms have only been available recently, many of these options have been provided by telecommunication companies for several years.

Since the divestiture of North America's telecommunication market, there has been an increase in the amount of participants throughout the various fields of the industry; both facilities and non-facilities based. Additional competitors, e.g., CLECs, have joined incumbent local exchange carriers (LECs), local service providers (LSPs), line resellers, service providers, etc., in the telephony market.

While expanded competition has arguably benefitted the public, an undesired result has included many, often confusing, choices of service providers. The increase in competition has also disrupted the fluidity of the telecommunications market that existed before divestiture for both the consumer and the market participant. One area affected by the increased amount of competitors in the telephone market is billing. A customer could potentially receive a separate billing statement for services received from each subscribed telephone service provider. Additionally, some market participants do not have the ability to sufficiently identify the end customer receiving its service.

Convergence or composite billing is an attempt to address and resolve some of these issues by providing one consolidated communications bill to the customer. The composite bill comprises charges incurred by the customer having a variety of telephone service providers, e.g., local, long distance, Internet, cell phone, paging, alternative billing, etc. This single communication bill is compiled and sent to the customer by a billing entity ultimately responsible for billing the customer. For example, a customer may contract with two different service providers for local and long distance service even though these service providers may be competitors in both local and long distance markets. One of these service providers, or perhaps some other company, is ultimately responsible as the billing entity for providing one complete telephone communications bill to the customer. The other service providers will receive compensation dependent upon their respective business relationship with the billing entity.

Due to some complexities involved with convergence billing, many industry participants may be susceptible to revenue losses because of the inability to identify the ultimate billing entity responsible for billing the party receiving its services. It is important for service providers seeking compensation to adequately identify the billing entity associated with the customer receiving such services to avoid monetary loses resulting from an unpaid service.

Presently, many phone companies utilize a line information database, LIDB, for acquiring information associated with a telephone number. LIDBs provide a variety of information. Some of the information stored in the LIDB relates to billing entities associated with telephone numbers. This information can be obtained directly, or indirectly, from fields such as operating company numbers (OCNs), account owner (AO), originating line number screening (OLNS), line providers, alternative billing services, number portability, calling features, etc. Typically, LIDB owners charge a fee to subscribers for accessing the information compiled within the LIDB.

An alternatively billed call, e.g., collect call, is a service provided to telephone customers wherein another party, e.g., called party, is billed for the call as opposed to the routinely billed calling party or originating line number. Upon receiving a request for a collect call, the telephone company ultimately responsible for billing, i.e., billing entity, the calling party will attempt to identify the billing entity ultimately responsible for billing the called party. This information is often obtainable through the LIDB. If the identity of the called party's billing entity is not obtainable, the caller's telephone company may be reluctant to connect the call between the parties. Because of the risk involved with connecting a collect call to a called party having an unidentified billing entity, many callers' billing entities may choose not to complete the connection for the call and thus, forgo potential revenues. This loss of revenue may be due to the inability to accurately bill for services provided or the perception that the called party to be billed is not a credit worthy consumer. Regardless, potential revenues associated with unbillable and uncollected collect calls are deferred, perhaps never to be realized.

This invention is directed to solving these and other problems.

SUMMARY OF THE INVENTION

The present invention is directed to a method of acquiring the identity of a telephone company of a called party receiving a collect telephone call. Proper identification of the called party's billing entity reduces the risk associated with uncollectable charges for services provided.

One embodiment of the present invention is a method for determining a billing entity ultimately responsible for billing a called party of an alternatively billed telephone call. The method comprises receiving a telephone number associated with the called party. An entity identifier associated with the telephone number is acquired. An OLNS query is invoked to a LIDB database associated with the telephone number of the called party. An OCN is received in response to the OLNS query. The entity identifier is replaced with the OCN returned from the OLNS query.

A further aspect of the present invention includes updating a negative database with information gathered during determination of the identity of the billing entity.

Other advantages and aspects of the present invention will become apparent upon reading the following description of the drawings and detailed description of the invention.

BRIEF DESCRIPTION OF DRAWINGS

FIG. 1 depicts a flow chart of one embodiment of the present invention.

DETAILED DESCRIPTION OF PREFERRED EMBODIMENT

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

The present invention is directed to enhancing the ability to determine an identity of a billing entity ultimately responsible for billing for services related to establishing an alternatively billed telephone call. Specifically, the present invention provides a method for acquiring more reliable information related to identifying a telephone company responsible for billing a called party of a collect telephone call. Acquiring more accurate information for identifying the billing company reduces the monetary risk of not receiving payment for services provided in establishing a collect telephone call. Providing the ability to determine the identity of a company, i.e., convergent or composite biller, ultimately responsible for billing the called party of a collect call will enhance the ability to receive payment for the service.

Identification of the billing entity is available in varying forms and in several locations. A billing entity identifier, i.e., operating company number (OCN), is one source of company identification available from a line information database (LIDB). The OCN is a four-position field used to identify service a providers that are facility-based and non-facility-based, e.g., service resellers. Other types of billing entity identifiers include account ownership (AO) and service provider identification (SPID). The SPID is typically associated with facility-based providers and is usually available from a number portability administration or access center database (NPAC). The AO is often available from the LIDB and is regarded as a highly accurate source of identification for the responsible billing entity.

FIG. 1 is a flow chart 10 depicting an embodiment of the present invention. A calling party places a collect telephone call to a called party. The collect call is a request by the calling party to have the called party billed for the telephone call. The collect telephone call is an alternatively billed service wherein the called party is billed instead of the routinely billed calling party. Because the telephone company associated with the calling party may not be associated with the called party, the calling party's telephone company must be capable of identifying the billing entity of the called party. Providing the ability to place a collect telephone call introduces risk to the calling party's telephone company because the caller's billing entity may not be associated with the called party's billing entity that is ultimately responsible for billing for the collect call, and therefore, the identity of the called party's billing entity may not be easily known. Obviously, receiving compensation for providing services is important, and thus, it is imperative that the most accurate information be obtained for identifying the billing entity ultimately responsible for billing the customer. As such, it is in the calling party's company's interests to determine this information. Enhancing a telephone company's ability to acquire this information will further ensure that it will be compensated for its services.

Upon receiving a 10 digit telephone number of the called party, several databases can be utilized to acquire further information. These databases include ACSED, TPM, and LARG. Each database can provide information to enhance the ability to acquire a more accurate determination of the identity of the responsible billing entity. In addition, a telephone company's own private database, i.e., negative database, can be maintained and utilized during this determination. Pertinent information gathered by the telephone company can be stored in the negative database and associated with specific telephone numbers encountered by the telephone company. Maintaining this additional source of information can facilitate the telephone services provided to the customer.

The ACSED database 12 (area code split exchange diskette) provides information related to area codes, i.e., splits and additions, wherein multiple area codes are allowed during a permissive dialing period. Allowing multiple area codes during prescribed dialing periods results in an additional, i.e., alternate, telephone number for a customer during this period. The ACSED database 12 maintains a listing of NXXs (prefixes, exchanges) involved with these area code changes.

The TPM (terminating point masterfile) and LARG (LIDB access routing guide) databases 14 are utilized to determine whether the telephone number is portable 14. Local number portability (LNP) was enacted to facilitate competition among LECs and CLECs. Number portability allows consumers to switch between the competing telecommunications companies and yet maintain the same telephone number. This switch can be to another facility-based provider or a reseller of telephone services. Since approximately 85% of all telephone numbers are portable, and the aim is to increase this level, it is highly likely that the called party will have a telephone number that is capable of being ported. Therefore, due to the flexibility provided by portable telephone numbers, it is increasingly possible that the company originally designated as the billing entity is no longer functioning as the composite biller.

The TPM database provides information related to the LIDB associated with the called telephone number. The TPM supports various systems used in rating and billing and is a source for NPA/NXX-related data, time zone, OCN, etc. The LARG provides information on routing to the proper LIDB associated with the called telephone number. The LARG provides routing information necessary to route an inquiry to the appropriate LIDB for the validation of calling cards and other alternately billing services (ABS), e.g., collect calls and third party payment.

The portability of the called telephone number can be determined by utilizing the first six digits of the telephone number, i.e., NPA-NXX. The NPA-NXX digits are utilized during access of the ACSED, TPM, and LARG databases. The first three digits, Number Plan Area, (NPA), represent the area code and the next three digits, NXX, represent the exchange number, e.g., prefix or Central Office Code (CO).

If the telephone number of the called party is not portable, the OCN obtained during access with the databases is initially considered the most accurate identifier of the billing entity associated with the called telephone number and will be utilized as the billing entity identifier unless a more accurate identifier can be later obtained. Identification of the called party's telephone company provides the caller's telephone company the ability to determine whether a billing contract, i.e., billing and collection agreement, exists between the two companies.

After the billing entity of the non-portable billing number has been identified, a validation query, e.g., alternative billing screening (ABS), or billing number screening (BNS); is sent to the LIDB identified by the LARG and associated with the called telephone number to determine a line status of the called party 30. The validation query determines the line status and verifies whether any prohibitions have been placed upon the called party that prevent placement of a collect telephone call. The line status may include information concerning whether the called party is blocked from receiving collect calls, or the called party is considered as being a credit risk, etc.

It may be possible that the validation query, preferably BNS, will return AO information related to the responsible billing entity of the called party. If so, the AO will be utilized in place of the OCN originally obtained during the interaction with the databases 14. Thus, AO is considered a more accurate identifier of the billing entity than the OCN; and if available, the AO should be utilized over the OCN as the billing entity identifier. Once this information is acquired, it can be stored by the telephone company for future access related to this telephone number, e.g., negative database.

The determination of the billing entity for a portable telephone number requires additional steps to ensure the accuracy of the identification of the billing entity. Since there is a possibility that the original telephone company responsible as the billing entity is no longer associated with the portable telephone, a local number portability (LNP) check is performed with an NPAC 18. The NPAC cooperates in the implementation of LNP and serves to synchronize the numbering databases and to coordinate the porting process.

The LNP check facilitates the determination of whether another company has become ultimately responsible as the billing entity for the called party. Often times, a facility based provider, as opposed to a service reseller, is associated with the telephone number 20. The 10 digit telephone number is searched and if the number is found within the NPAC database, an attempt is made to acquire the service provider identification 22, SPID. If so, the SPID will be utilized in place of the OCN originally acquired from the databases utilized during the LNP look-up. Although the SPID is similar to the OCN, it is considered to be a more accurate identifier of the billing entity; and if the SPID is available, it will be utilized in place of the OCN for billing purposes. After attaining the identification of the responsible billing entity, a validation query 30, e.g., ABS or BNS, is invoked to the LIDB identified during the NPAC search, i.e., LNP LIDB. Similar to the validation query to the LIDB determined by the LARG, if the validation query to the LNP LIDB supports and returns AO, the AO will be used as the identifier of the billing entity in place of the SPID.

If the 10 digit telephone number is not found during the LNP query 20, and the LIDB associated with the called party supports AO, a validation query 30 is invoked to the LIDB identified by the LARG. The AO returned by the LIDB in response to the query will be utilized for identification of the telephone company to be billed. However, if the 10 digit telephone number is not found during the LNP query 20 and the associated LIDB does not support AO, yet it supports originating line number screening (OLNS); an OLNS query is invoked to the LIDB identified by the LARG. The OCN will be returned in response to the query and will be utilized to identify the responsible billing entity. If OLNS is not supported, the initial OCN acquired during access with the TPM and LARG 12, 14 will be used for billing purposes. Regardless of whether OLNS is supported or not, the validation query, e.g., ABS or BNS, preferably BNS, is invoked to the LIDB determined by the LARG to confirm line status and the ability to place a collect telephone call 30.

Alternatively, it is contemplated that identity of the billing entity may not be able to be acquired. In such a case, the caller may be informed that the call cannot be connected. Alternatively, the caller may be provided the opportunity to submit other payment options, e.g., calling card, credit card, third party billing, etc.

While the specific embodiment has been illustrated and described, numerous modifications come to mind without significantly departing from the spirit of the invention, and the scope of protection is only limited by the scope of the accompanying claims.

We claim:

1. A method for determining an identity of a billing entity responsible for billing a called party of an alternatively billed telephone call, the method comprising the steps of:

receiving a telephone number, the telephone number being associated with the called party;

acquiring a billing entity identifier from a first database, the billing entity identifier being an operating company number (OCN) associated with the telephone number;

invoking an originating line number screening (OLNS) query to a line information database (LIDB) database associated with the telephone number of the called party;

receiving an OCN in response to the OLNS query; and replacing the billing entity identifier acquired from said first database with the OCN received in response to the OLNS query.

2. The method of claim 1 further comprising:

invoking a validation query to the LIDB database for determining a line status;

receiving a reply in response to the validation query; and updating the billing entity identifier in response to the reply received in response to the validation query.

3. The method of claim 2 further comprising:

updating a negative database with the billing entity identifier.

4. The method of claim 2 wherein the validation query to the LIDB database is an alternative billing service (ABS) query.

5. The method of claim 2 wherein the validation query to the LIDB database is a billing number screening (BNS) query.

6. The method of claim 1 wherein acquiring a billing entity identifier comprises the steps of:

accessing an area code split exchange diskette (ACSED) database to determine an alternate telephone number.

7. The method of claim 6 further comprising:

accessing a terminating point masterfile (TPM) database; and determining the LIDB database in response to the alternate telephone number.

8. The method of claim 1 further comprising:

determining portability of the telephone number;

acquiring a service provider identification (SPID) associated with the telephone number; and replacing the billing entity identifier with the SPID.

9. The method of claim 8 wherein acquiring a SPID comprises:

accessing a number portability administration center (NPAC) database;

performing a local number portability (LNP) lookup in response to the telephone number; and identifying an LNP LIDB associated with the telephone number.

10. The method of claim 9 further comprising:

invoking a BNS query to the LNP LIDB for determining a line status;

receiving a reply in response to the BNS query to the LNP LIDB; and updating the billing entity identifier in response to the reply received.

11. The method of claim 10 further comprising:
updating a negative database with the billing entity identifier.

12. A method for determining the identification of a billing entry ultimately responsible for billing a called party of an alternately billed telephone call, the method comprising the steps of:
receiving a telephone number, the telephone number being associated with the called party;
utilizing a terminating point masterfile (TPM) and a line information database (LIBD) access routing guide (LARG) database to acquire a billing entity identifier, the billing entity identifier being an operating company number (OCN) associated with the telephone number;
utilizing the TPM and LARG databases to identify a LIDB in response to a portion of the telephone number;
invoking an originating line number screening (OLNS) query of the identified LIDB;
determining the account owner, the account owner being derived in response to the reply returned from the OLNS query; and
replacing the billing entity identifier with the determined account owner derived in response to the reply returned from the OLNS query.

13. The method of claim 12 further comprising:
acquiring a company identifier in response to the OLNS query.

14. The method of claim 12 further comprising:
invoking a billing number screening (BNS) query to the LIDB identifier by the TPM and LARG in response to the telephone number.

15. The method of claim 12 further comprising:
accessing the LARG to determine whether the telephone number of the called party of portable.

16. The method of claim 15 further comprising:
accessing a number portability administration center (NPAC) database in response to the determination of whether the telephone number is portable; and
utilizing a portion of the telephone number of the called party to determine the local number portability of the telephone number.

17. A method for determining identification of a billing entity having responsibility for billing a called party of an alternatively billed telephone call, the method comprising the steps of:
receiving a request to provide a line status and a company identifier, the line status and company identifier being associated with a telephone number of the called party
utilizing a terminating point masterfile (TPM) and a line information database (LIBD) access routing guide (LARG) database to acquire the company identifier, the company identifier being an operating company number (OCN) associated with the telephone number;
utilizing the TPM and LARG databases to identify a LIDB in response to a portion of the telephone number;
determining whether the telephone number is portable;
invoking an originating line number screening (OLNS) query of the identified LIDB;
determining the account owner, the account owner being derived in response to the reply returned from the OLNS query; and
replacing the company identifier with the determined account owner derived in response to the reply returned from the OLNS query.

18. The method of claim 17 wherein the determining the portability of the telephone number further comprises:
accessing a number portability administration center (NPAC) database in response to the determination of whether the telephone number is portable;
searching the NPAC database for the telephone number;
invoking a billing number screening (BNS) query in response to the search, the BNS query for determining whether the LIDB database provides account ownership identification date;
invoking an OLNS query to the LIDB database in response to the BNS query;
acquiring an OCN in response the OLNS query;
invoking a validation query to the LIDB database for determining an ability to receive the collect call; and
responding to the requester.

19. The method of claim 18 further comprising the step of:
utilizing the OCN to determine the billing entity having responsibility for billing the associated telephone number.

20. A method for determining an identity of a billing entity responsible for billing a called party of an alternatively billed telephone call, the method comprising the steps of:
receiving a telephone number, the telephone number being associated with the called party;
acquiring an initial entity identifier, the initial entity identifier being an operating company number (OCN) associated with the telephone number and acquired form a line information database (LIDB) identified by a terminating point masterfile (TPM) database in cooperation with a LIBD access routing guide (LARG) database in response to the telephone number;
determining whether the telephone number is portable;
invoking either a method for determining the identity of the entity in response to the determination of the telephone number being portable or a method for determining the identity of the entity in response to the determination of the telephone number being non-portable,
the method for determining the entity identity for the telephone number being non-portable comprising the steps of:
invoking a first billed number screening (BNS) query to the LIDB being associated with the telephone number; and
updating the entity identifier in response to a first account owner (AO) being returned in response to the first BNS query to the LIDB;
the method for determining the entity identity for the telephone number being portable comprising the steps of:
determining whether the telephone number is associated with a facility based provider;
performing a local number portability (LNP) search of a number portability administration center (NPAC) database to determine whether the telephone number is associated with a facility based provider or a non-facility based provider;
invoking either a method for determining the identity of the entity in response to the determination of the telephone number being associated with a facility based provider or a method for determining the identify of the entity in response to the determination of the telephone number being associated with a non-facility based provider;

the method for determining the identity of the entity in response to the determination of the telephone number being associated with a facility based provider comprising the steps of:
  determining whether a service provider identification (SPID) is associated with the telephone number, the SPID being acquired form a LNP LIDB being identified during the LNP search;
  invoking either a method for determining the identity of the entity in response to a SPID being available or a method for determining the identity of the entity in response to the SPID not being available:
the method for determining the identity of the entity in response to the SPID being available comprising the steps of:
  assigning the SPID as the entity identifier:
  invoking a second BNS query to the LNP LIDB; and
  updating the entity identifier in response to a second AO being returned from the second BNS Query invoked to the LNP LIDB;
the method for determining the identity of the entity in response to the SPID not being available comprising the steps of:
  determining whether the LIDS supports AO;
  invoking either a method ofr determining the identity of the entity in response to the determination that the LIDB supports AO or a method for determining the identity of the entity in response to the determination that the LIDB does not support AO;
the method for determining the identity of the entity in response to the determination that the LIDB supports AO comprising the steps of:
  invoking a third BNS query to the LIDB being associated with the telephone number and determined by the LARG; and
  updating the entity identifier in response to third AO being returned in response to the third BNS query to the LIDB;
the method for determining the identity of the entity in response to the determination that the LIDB does not support AO comprising the steps of:
  determining whether the LIDB supports originating line number screening (OLNS);
  invoking either a method for determining the identity of the entity in response to the determination that the LIDB supports AO or a method for determining the identity of the entity in response to the determination that the LIDB does not support OLNS;
the method for determining the identity of the entity in response to the determination that the LIDB does support OLNS comprising the steps of:
  invoking an OLNS query to the LIDB determined by the LARG;
  receiving an OCN in response to the OLNS query;
  assigning the OCN received in response to the OLNS query as the entity identifier;
  invoking a fourth BNS query to the LIDB determined by the LARG; and
  updateing the entity identifier in response to a fourth AO being returned in response to the fourth BNS query invoked to the LIDB;
the method for determining the identity of the entity in response to the determination that the LIDB databse does support OLNS comprising the steps of:
  invoking a fifth BNS query to the LIDB determined by the LARG; and
  updating the entity identifier in response to a fifth AO being returned in response to the fifth BNS query invoked to the LIDB;
the method for determining the identity of the entity in response to the determination of the telephone number being associated with non-facility based provider comprising the steps of:
  invoking the method for determining the identity of the entity in response to the SPID not being available.

21. The method of claim 20 further comprising:
updating a negative database with the entity identifier.

* * * * *